United States Patent
Marinet et al.

(10) Patent No.: US 7,889,778 B2
(45) Date of Patent: Feb. 15, 2011

(54) DEVICE FOR DETECTING AN ATTACK AGAINST AN INTEGRATED CIRCUIT CHIP

(75) Inventors: Fabrice Marinet, Chateauneuf le Rouge (FR); Camille Botella, Rousset (FR)

(73) Assignee: STMicroelectronics, SA, Montrouge (FR)

( * ) Notice: Subject to any disclaimer, the term of this patent is extended or adjusted under 35 U.S.C. 154(b) by 923 days.

(21) Appl. No.: 11/096,758

(22) Filed: Mar. 31, 2005

(65) Prior Publication Data

US 2005/0218401 A1     Oct. 6, 2005

(30) Foreign Application Priority Data

Mar. 31, 2004    (FR) .................................. 04 50630

(51) Int. Cl.
*H04B 1/00*      (2006.01)
(52) U.S. Cl. .................. 375/140; 375/215; 375/226; 375/227; 375/364
(58) Field of Classification Search ............... 375/140, 375/215, 226, 227, 364
See application file for complete search history.

(56) References Cited

U.S. PATENT DOCUMENTS 4,604,756 A    8/1986   Moustakas et al.
5,764,598 A  *  6/1998   Okayasu ...................... 368/120
2004/0119452 A1* 6/2004  Florence et al. .............. 323/282

FOREIGN PATENT DOCUMENTS

| EP | 0378306 | 7/1990 |
| EP | 1058178 | 12/2000 |
| EP | 1136942 | 9/2001 |

OTHER PUBLICATIONS

French Search Report, FR 0450630, Mar. 23, 2005.
Kommerling, Oliver, et al., Design Principals for tamper-Resistant Smartcard Processors, Proceedings of the USENIX Workshop on Smartcard Technology, pp. 9-20, 1999.

* cited by examiner

*Primary Examiner*—Shuwang Liu
*Assistant Examiner*—Kabir A Timory
(74) *Attorney, Agent, or Firm*—Lisa K. Jorgenson; Kevin D. Jablonski; Graybeal Jackson LLP

(57) ABSTRACT

A circuit for detecting attacks by contacting an integrated circuit chip comprising means for applying a random signal to a first terminal of at least one conductive path formed in at least one first metallization level of the chip, means for comparing the applied signal with a signal present on a second terminal of the path, and means for delaying the comparison time with respect to the application time, of a duration longer than or equal to the propagation delay through the first path.

15 Claims, 3 Drawing Sheets

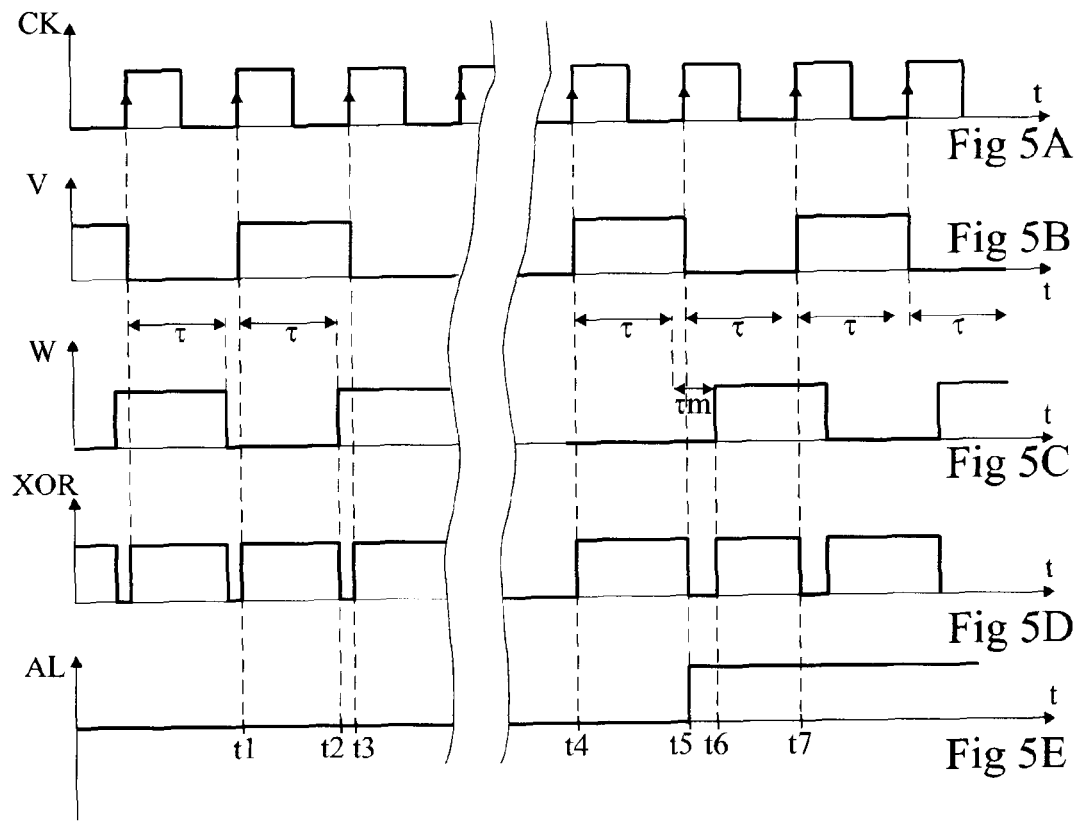
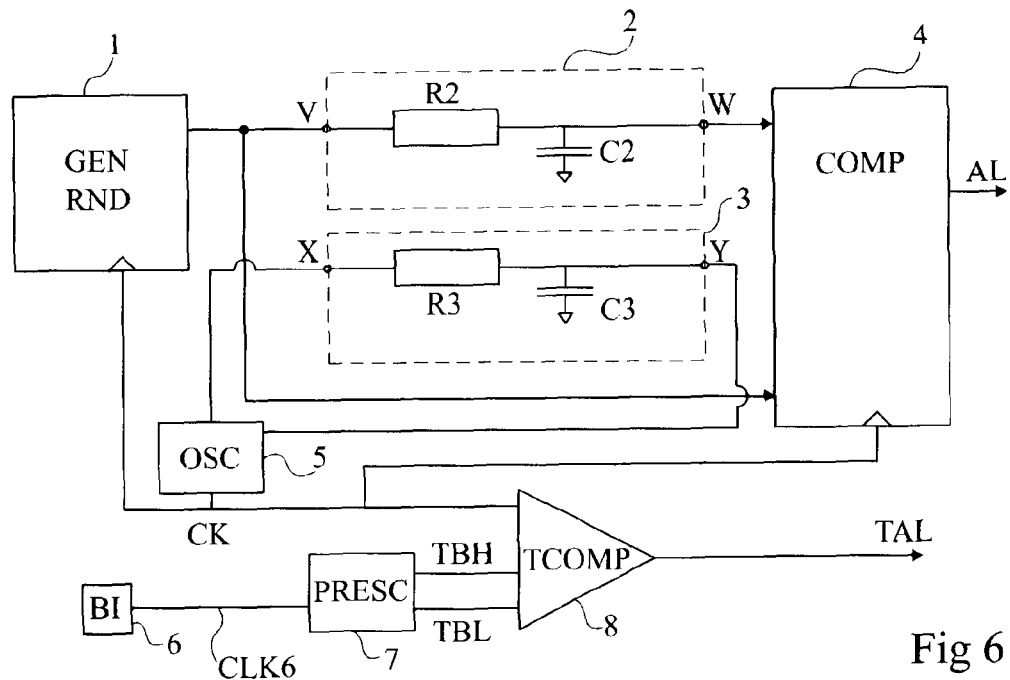

:

DEVICE FOR DETECTING AN ATTACK AGAINST AN INTEGRATED CIRCUIT CHIP

PRIORITY CLAIM

This application claims priority from French patent application No. 04/50630, filed Mar. 31, 2004, which is incorporated herein by reference.

BACKGROUND OF THE INVENTION

1. Field of the Invention

Embodiments of the present invention relate to a circuit for detecting attacks by contacting an integrated circuit chip. This type of attack is generally called an "intrusion attack" and consists of applying conductive pins directly on areas of the chip to sample signals therefrom. In an integrated circuit, the active layers contain information processing circuits which may be sensitive, such as for example in credit card chips or access control chips in toll television applications.

2. Discussion of the Related Art

To protect circuits located in the active area from any fraudulent intrusion, it is known to use a screen covering the entire surface or an area thereof. This screen is generally formed of one or several metallizaton levels higher than the active area to be protected.

FIG. 1 shows, in a perspective view of the chip, a conventional example of an active area (ACT) covered with different metallization levels (M1 ... Ms). A conductive path 2 delimited by terminals (V) and (W) is formed in one of these levels, for example, upper metallizabon level Ms. A vertical contact (via) enables connecting the conductive path formed in the higher metallizabon level (Ms) to other paths formed in the lower metallizaton levels.

The aim of these conductive paths is to detect a continuity interruption or any electric modification of their properties, for example, resistance and capacitance. These conductive paths run along the entire surface or only an area of the circuit to be protected, irregularly and randomly. If a "pirate" attempts to cross the metallization level containing the path, by introduction of one or several pins, a detection circuit is supposed to detect an interruption in the conductive path.

FIG. 2 very schematically illustrates in the form of blocks a conventional example of a circuit for detecting an attack against an integrated circuit chip.

In this example, several detection circuits (DET1, DET2, DET3) compare a random signal applied by a generator 1 (GEN RND) on a first terminal (V) of conductive path 2 with the signals present on several other terminals of the path. For example, any difference between the applied random signal and the signal present on output terminal W is detected and means an attack by contact with the chip, symbolized by alarm signal (AL) in FIG. 2. This detection may also be performed by conductive path sections, that is, at intermediary length levels (detectors DET1 and DE2 locating the section of the path where the attack has been conducted.

A disadvantage of such a solution is that is does not avoid for the conductive path to be duplicated by an external section to simulate an electric continuity.

SUMMARY OF THE INVENTION

An embodiment of the present invention is overcoming the disadvantages of known solutions. In particular, embodiments of the present invention aim at improving the detection of intrusion attacks on an integrated circuit chip. Other embodiments of the present invention especially aim at providing a solution that detects any trap attempt on the protective path.

To achieve these and other embodiments, one embodiment of the present invention provides a circuit for detecting attacks by contact of an integrated circuit chip comprising:

a means for applying a random signal to a first terminal of at least one conductive path formed in at least one first metallization level of the chip;

a means for comparing the applied signal with a signal present on a second terminal of the path; and a means for delaying the comparison time with respect to the application time, of a duration longer than or equal to the propagation delay brought by the first path.

According to an embodiment of the present invention, the application means and the comparison means are synchronized by a same clock signal, the period of which is said duration of the means for delaying the comparison time.

According to an embodiment of the present invention, said duration is obtained through a second conductive path formed in a second metallization level of the chip.

According to an embodiment of the present invention, said duration is obtained through a second conductive path formed in the same level as the path.

According to an embodiment of the present invention, said conductive paths are parallel to each other.

According to an embodiment of the present invention, the respective projections of the two paths in a plane parallel to the chip plane are parallel to each other.

According to an embodiment of the present invention, the spacing between the two conductive paths defines a coupling capacity conditioning said propagation delay.

According to an embodiment of the present invention, the spacing between the two conductive paths defines a coupling capacity conditioning said duration.

According to an embodiment of the present invention, the circuit further comprises a means for checking that said duration is within a predetermined range.

Embodiments of the present invention may be utilized in an integrated circuit chip.

The foregoing aspects, features, and advantages of the present invention will be discussed in detail in the following non-limiting description of specific embodiments in connection with the accompanying drawings.

BRIEF DESCRIPTION OF THE DRAWINGS

FIGS. 5A to 5E illustrate in the form of timing diagrams the operation of the circuit of FIG. 4; and FIG. 6 shows an alternative of the circuit according to an embodiment of the present invention.

DETAILED DESCRIPTION

Figure 1:
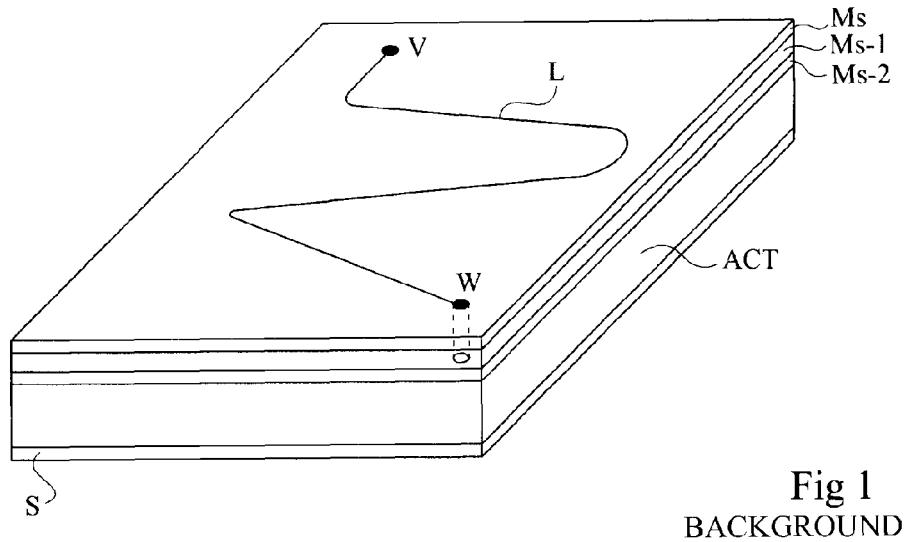
FIGS. 1 and 2, previously described, are intended to show the state of the art and the problem to solve.
Figure 2:
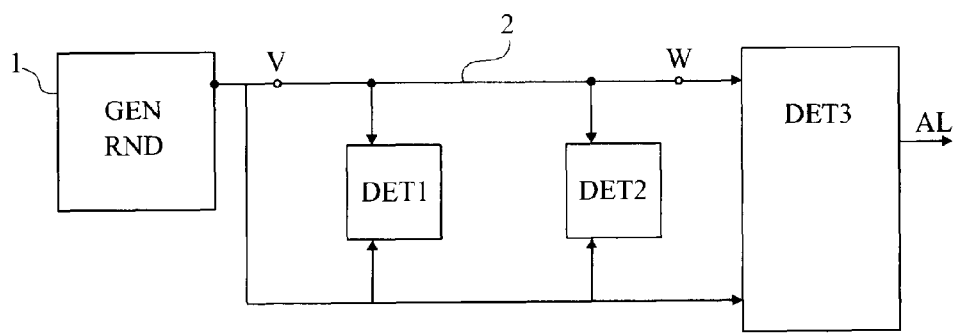

The following discussion is presented to enable a person skilled in the art to make and use the invention. Various modifications to the embodiments will be readily apparent to those skilled in the art, and the generic principles herein may be applied to other embodiments and applications without departing from the spirit and scope of the present invention. Thus, the present invention is not intended to be limited to the embodiments shown, but is to be accorded the widest scope consistent with the principles and features disclosed herein.

Same elements have been designated with same reference numerals in the different drawings. For clarity, only those elements which are necessary to the understanding of the present invention have been shown in the drawings and will be described hereafter. In particular, what exploitation is made of the detection results has not been detailed, the present invention being compatible with the implementation of conventional methods.

A feature of an embodiment of the present invention is to check the constancy of a propagation delay of a random signal carried by a conductive path formed in a metallization level. This delay is shorter than the period of a clock signal synchronizing the comparison times. Preferably, this clock signal is itself conditioned by another conductive path in a metallizaton level.

Figure 3:
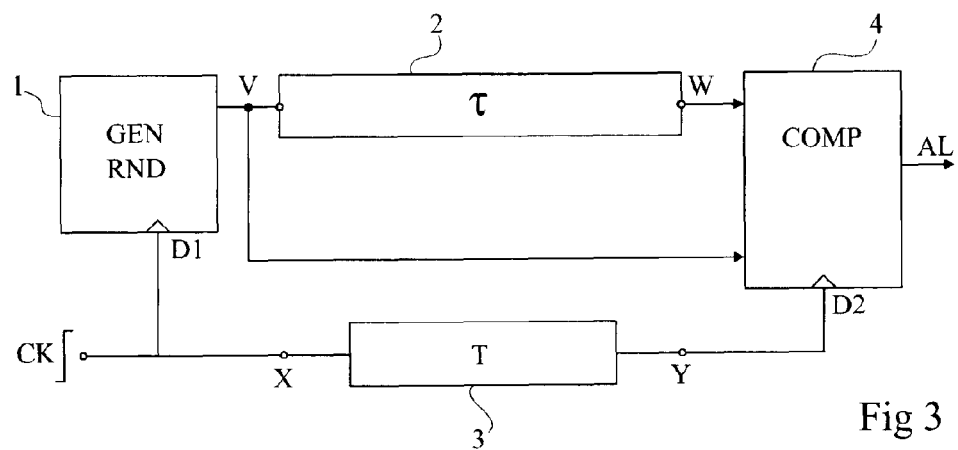
FIG. 3 very schematically shows in the form of blocks a detection circuit according to an embodiment of the present invention.

FIG. 3 schematically shows a circuit for detecting an intrusion attack against an integrated circuit chip according to an embodiment of the present invention. In this example, a generator 1 (GEN RND) applies a same random signal directly to an input terminal of a comparator 4 (COMP) as well as to a first end terminal V of a conductive path 2 formed in a first metallizabon level of the chip ("first" does not necessarily refer to an order in the metallizabon level stacking). The other end terminal W of the path is directly connected to a second input terminal of comparator 4. Conductive path 2 delays by a duration τ the application of the random signal to the second end of comparator 4 to which end W is connected. A synchronization signal CK is applied to a triggering input D1 of generator 1 and, preferably, to a first input terminal X of a path 3 formed in a second metallization level of the chip ("second" does not necessarily refer to an order in the metallizaton level stacking). The other end terminal Y of path 3 is connected to a triggering input D2 of comparator 4. The comparison is triggered by synchronization signal CK, itself delayed with respect to the time of application of terminal V by a duration T set by path 3. Duration T is selected to be longer than or equal to duration τ. The reason for this condition on durations sand T will better appear from the description of FIG. 5. Comparator 4 provides a result AL indicative of a modification of duration τ or T.

Figure 4:
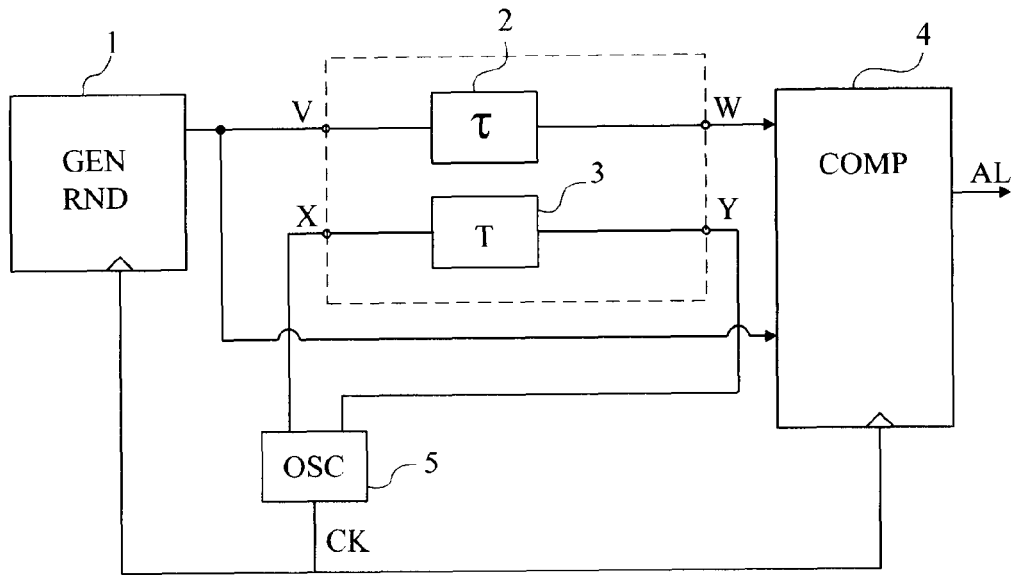
FIG. 4 very schematically shows in the form of blocks a preferred embodiment of the present invention.

FIG. 4 illustrates a preferred embodiment of the present invention in which the signal triggering comparator 4 is applied to terminal X of path 3 by a dock 5 (OSC) of period T The duration of period T of clock 5 preferably is the propagation delay of conductive path 3 (FIG. 3).

Figure 4A:
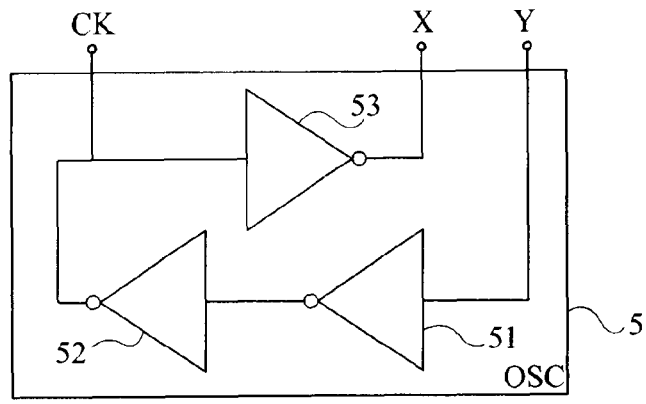
FIGS. 4A and 4B illustrate details of the circuit of FIG. 4 according to an embodiment of the present invention.

FIG. 4A shows an example of a portion of a dock circuit known as a ring oscillator formed of three inverters 51, 52, and 53 in series between terminals Y and X (FIG. 4). The period of this ring clock corresponds to the propagation delay materialized by conductive path 3. Clock signal CK is sampled between inverters 52 and 53. Of course, other forms are possible.

Figure 4B:
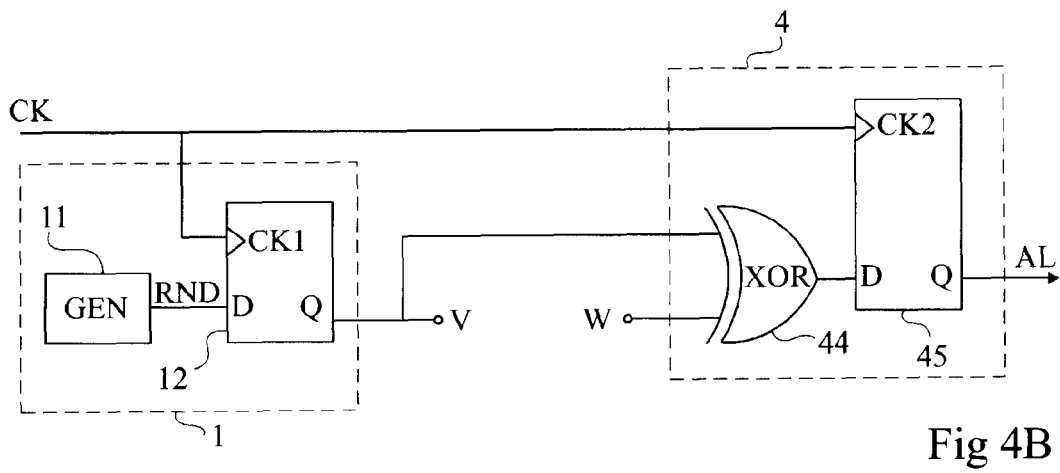

FIG. 4B shows an example of the forming of comparator 4 and of generator 1. Generator 1 is formed of a D-type flip-flop 12 having its data input receiving a random signal RND provided by a generator 11. The comparator is formed of a D-type flip-flop 45, and of an XOR gate 44. The Q output of flip-flop 12 and the input of gate 44 are respectively connected to terminals V and W of path 2 (FIG. 4) materializing delay τ. Random signal RND is loaded on the Q output of flip-flop 12, each time the edge (for example, the rising edge) of dock signal CK is applied on its clock input CK1. The random signal thus loaded is then applied both on terminal V and on one of the two inputs of XOR gate 44, the other input of which is connected to terminal W The output signal of gate 44 is applied to the D input of flip-flop 45 to be loaded on its Q output, each time the rising edge of clock signal CK is applied on its clock input CK2. The Q output of flip-flop 45 provides detection signal AL. In fact, XOR gate 44 compares the same random signal RND applied at the same time with no delay on one input and delayed by a time τ through path 2 (terminals V and W on the other. The output of XOR gate 44 detects any difference between a same random signal RND conveyed directly and indirectly through path 2. The operation of the circuits of FIG. 4 will better appear from the description of FIG. 5.

FIGS. 5A to 5E illustrate, in the form of timing diagrams, an example of shapes of characteristic signals at different points of the detection circuit. These drawings respectively show the signals of clock CK, of generator 1 (RND), of the signal on terminal W of path 2, of the output signal of gate 44 (XOR), and of attack detection signal AL. These timing diagrams show in their left-hand portion an operation with no attack detection, and in their right-hand portion an operation with an attack detection.

In normal operation, assume a high state provided by generator 1 (FIG. 5B) at a time t1 to terminal V of path 2 and then falling to the low state at a time t3. At a time t2 (prior to time t3), this high state appears on terminal W (FIG. 5C) as being delayed by a time τ. Accordingly, the output of XOR gate 44 (FIG. 5D) switches high at time t1 to then fall back to the low state at time t2. The output of gate 44 being taken into account at each dock cycle corresponding to times t1 and t3, output AL (FIG. 5E) of comparator 4 remains low from time t1 to time t3, indicating that no modification in duration τ has been detected within this time interval. Output signal AL remains low as long as duration τ of path 3 is not modified and as long as said duration remains shorter than or equal to period T of oscillator 5. The case of a duration τ longer than period T corresponds to an attack situation resulting, for example, from a momentary interruption in the electric continuity of conductive path 2 during a physical intrusion into the metallizaton level in which said path is formed.

In the case of an operation with an attack detection, assume a high state provided by generator 1 (FIG. 5B) at a time t4 to terminal V of path 2 and then falling to the low state at a time t5 (rising edge of the next period of signal CK). Also assume that at a time 6 subsequent to time t5, this high state appears on terminal W (FIG. 5C) as delayed by a time τ increased by a duration τm (greater than T−τ), thus simulating a modification in duration τ by attack. In this case, the output of XOR gate 44 (FIG. 5D) is high between time intervals t4 to 5. Since the output of gate 44 is taken into account at each dock edge (times t4, t5, and t7), output AL (FIG. 5E) of comparator 4 switches high from as soon as time t5, indicating the modification of duration τ having occurred during period T corresponding to the interval from t4 to t5. In dual fashion, an attack causing the decrease of period T below period τ results in a switching to the high state of output AL according to a line of reasoning identical to that described hereabove.

FIG. 6 shows an alternative embodiment of the present invention in which conductive paths 2 and 3 are formed parallel to each other, preferably in a same metallization level. Each of paths 2 and 3 is materialized by a resistor (R2) and (R3) in series between its respective end terminals V, W, and X, Y, as well as by a capacitor (C2) and (C3) respectively placed between output terminals W and Y and the integrated circuit ground.

Resistors R2 and R3 result from the choice by design of the electric (resistivity of the conductive material) and geometric (length and cross-section) features. Capacitors C2 and C3 are materialized by the coupling resulting from the spacing between conductive paths 2 and 3. In this example, duration τ of path 2 and period T of path 3 are defined by the time constants of the RC circuits respectively materialized by R2C2 and R3C3 between respective end terminals V, W, and X, Y of paths 2 and 3.

As indicated in the description of FIG. 3, period T of clock 5 is selected to be longer than or equal to duration τ.

Preferably, paths 2 and 3 are parallel to each other and such that there is a strong possibility for a pin to cut at least one of them in case of an intrusion attempt. For the actual patterns, inspiration may be drawn from known solutions, knowing that the denser the pattern, the better the protection. Preferably, the projections of paths 2 and 3 in a horizontal plane (parallel to the chip plane) are parallel without being confounded (the paths are then not superposed).

In the alternative of FIG. 6, a secondary clock 6 (BT) applies a clock signal CLK6 of period TB onto the input of a circuit 7(PRESC) generating on its outputs two signals TBL and TBH respectively having shorter and longer periods than period T of clock 5. Signals TBL and TBH of circuit 7, as well as dock 5, are applied onto the three inputs of a comparator 8 (TCOMP) outputting a result (TAL). Comparator 8 permanently checks that period T of dock 5 is within a range having its low and high limits respectively defined by periods TBL and TBH. Result TAL of comparator 8 is activated as soon as period T of dock 5 comes out of the range delimited by TBL and TBH, here again meaning that an attack by modification of resistance R3 and/or of capacitance C3 of path 3 has been detected. Periods TBL and TBH are selected upon design of circuit 7 to cover a range of period T compatible with a realistic operation of the chip integrated circuit. Such an embodiment especially detects a disappearing of dock signal CK that may be another form of attack.

Preferably, the circuit of dock 6 is formed in an active area covered by different metallizaton levels in which are formed conductive paths 2 and 3 to be best protected against attacks consisting of modifying its value.

As an alternative, the dock-checking circuit may merely periodically check the existence of an edge at the oscillator output.

An advantage of embodiments of the present invention is that they improve the detection of intrusion attacks on an integrated circuit chip by intimately linking the period of the detection circuit clock with the chip. Further, embodiments of the present invention bring an increased protection against attacks by forced injection of signals from the outside of the chip, since it is based on the sending of random data at each clock period.

Another advantage of embodiments of the present invention is that they avoid duplication of the conductive path to be duplicated by an external section to simulate an electric continuity.

Of course, embodiments of the present invention are likely to have various alterations, modifications, and improvements which will readily occur to those skilled in the art. In particular, several conductive paths formed in different metallizaton levels may be provided. Similarly, it may be envisaged for several detection circuits according to embodiments of the present invention to be used at different clock frequencies and located in different areas of the chip.

Such alterations, modifications, and improvements are intended to be part of this disclosure, and are intended to be within the spirit and the scope of the present invention.

Accordingly, the foregoing description is by way of example only and is not intended to be limiting. The present invention is limited only as defined in the following claims and the equivalents thereto.

Protection circuits according to embodiments of the present invention may be utilized in a variety of different types of electronic devices, such as credit cards, debit cards, or as part of an integrated circuit contained in other types of devices.

What is claimed is:

1. A protection circuit, comprising:
   a signal generator operable to develop a security signal on an output node;
   a conductive path having an input node coupled to the output node of the signal generator and having an output node, the security signal applied on the input node being provided on the output node of the conductive path after a delay time;
   a comparison circuit coupled to the respective output nodes of the signal generator and the conductive path and operable to compare the signals on these output nodes only after a comparison time that is greater than the delay time, the comparison circuit being further operable to develop a comparison signal responsive to the comparison; and
   a trigger clock generator operable to develop a trigger clock signal having a period that is equal to or greater than the comparison time, and wherein the signal generator is operable to develop the security signal responsive to the trigger clock signal and wherein the comparison circuit is operable responsive to the trigger clock signal to compare the signals on the output nodes of the signal generator and the conductive path wherein the trigger clock signal generator includes a second conductive path that substantially determines the period of the trigger clock signal.

2. The protection circuit of claim 1 wherein the signal generator comprises a pseudorandom signal generator and the security signal is a pseudorandom signal.

3. The protection circuit of claim 2 wherein the security signal comprises a digital signal.

4. The protection circuit of claim 1 wherein the trigger clock signal generator comprises a ring oscillator.

5. The protection circuit of claim 1 wherein the conductive path comprises a plurality of interconnected conductive paths.

6. The protection circuit of claim 1 wherein the comparison circuit comprises a comparator.

7. The protection circuit of claim 6 wherein the comparator further comprises:
   an XOR gate having inputs coupled to receive the signals on the output nodes of the signal generator and conductive path and having an output; and
   a flip-flop having an input coupled to the output of the XOR gate and being clocked by a trigger clock signal having a period that is substantially equal to the comparison time.

8. An electronic device, comprising:
   an electronic circuit including a protection circuit, the protection circuit including,
   a signal generator operable to develop a security signal on an output node;
   a conductive path having an input node coupled to the output node of the signal generator and having an output node, the security signal applied on the input node being provided on the output node of the conductive path after a delay time; and a comparison circuit coupled to the output nodes of the signal generator and the conductive path and adapted to receive a clocking signal, the comparison circuit operable responsive to the clocking signal to compare the signals on these output nodes only after a comparison time that is greater than or equal to the delay time, the clocking signal defining the comparison time and the comparison circuit being further operable to develop a comparison signal responsive to the comparison; and a trigger clock generator operable to develop a trigger clock signal having a period that is equal to or greater than the comparison time, and wherein the signal generator is operable to develop the security signal responsive to the trigger clock signal and wherein the comparison circuit is operable responsive to the trigger clock signal to compare the signals on the output nodes of the signal generator and the conductive path wherein the trigger clock signal generator includes a second conductive path that substantially determines the period of the trigger clock signal.

9. The electronic device of claim 8 wherein the electronic circuitry is contained in one of an integrated circuit, credit card, and debit card.

10. The electronic device of claim 8 wherein the electronic circuitry is formed in an integrated circuit including at least one conductive layer, and wherein the conductive path is formed in at least one of the conductive layers.

11. The electronic device of claim 10 wherein the comparison time is determined by a conductive path formed in at least one of the conductive layers.

12. The electronic device of claim 11 wherein each conductive layer comprises a metal layer.

13. A method of detecting an attack to an integrated circuit, the method comprising:
generating a security signal;
delaying the security signal by a delay time to generate a delayed security signal;
generating a clocking signal independent of the security signal and the delayed security signal; and
responsive to the clocking signal, comparing the security signal and the delayed security signal, wherein the comparison interval is greater than or equal to the delay time;
wherein generating the security signal occurs responsive to a trigger clock signal having a period that greater than or equal to the comparison interval, and wherein the operation of comparing occurs responsive to the trigger clock signal; and
wherein delaying the security signal comprises applying the security signal through a conductive path and wherein the period of the trigger clock signal is applied through a second conductive path that substantially determines the period of the trigger clock signal.

14. The method of claim 13 wherein the security signal comprises pseudorandom digital signal.

15. The method of claim 13 further comprising:
determining whether the period of the trigger clock signal is within a clock period range; and
generating an alarm signal when the period of the trigger clock signal is not within the clock period range.

* * * * *

UNITED STATES PATENT AND TRADEMARK OFFICE
CERTIFICATE OF CORRECTION

PATENT NO. : 7,889,778 B2  
APPLICATION NO. : 11/096758  
DATED : February 15, 2011  
INVENTOR(S) : Fabrice Marinet et al.

Page 1 of 1

It is certified that error appears in the above-identified patent and that said Letters Patent is hereby corrected as shown below:

- In Claim 13, Column 8, Line 14 of the patent, please change the text "having a period that greater than or equal to" to --having a period greater than or equal to--.

Signed and Sealed this  
Third Day of April, 2012

David J. Kappos  
*Director of the United States Patent and Trademark Office*